July 29, 1958  R. S. REINHOLD  2,845,151
TUBE SKIN JOINT STRUCTURE
Filed Oct. 4, 1955  2 Sheets-Sheet 1

INVENTOR.
RICHARD S. REINHOLD
BY
Reynolds, Beach + Christensen
ATTORNEYS

July 29, 1958  R. S. REINHOLD  2,845,151
TUBE SKIN JOINT STRUCTURE
Filed Oct. 4, 1955  2 Sheets-Sheet 2
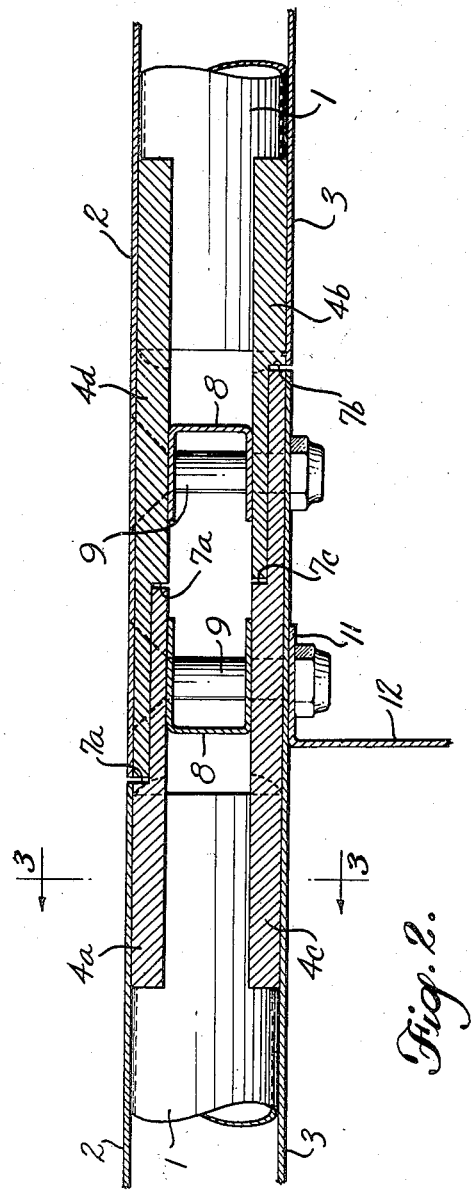
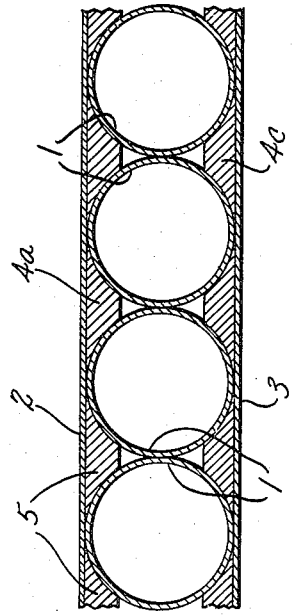
INVENTOR.
RICHARD S. REINHOLD
BY
Reynolds, Beach & Christensen
ATTORNEYS

United States Patent Office 2,845,151
Patented July 29, 1958

2,845,151

TUBE SKIN JOINT STRUCTURE

Richard S. Reinhold, Seattle, Wash., assignor to Boeing Airplane Company, Seattle, Wash., a corporation of Delaware Application October 4, 1955, Serial No. 538,435

6 Claims. (Cl. 189—34)

Airplane wing skins and like panels which are under stress in use, but which must be light in weight, are not uncommonly made of tubes placed side by side and extending in the direction of the principal stress, sandwiched between and secured to inner and outer skin sheets. It is not feasible for various reasons to make such panels continuous from root to wing tip, hence, it is necessary to join end-abutting panels at various stations outwardly along the wing. The present invention is concerned with a joint structure for use in joining two such tube skin panels at such a joint.

Such a joint structure must, of course, be light in weight, and yet capable of effective transmission of stresses from one panel to the other, to which end it must be capable of resisting shear stresses in the planes of the inner and outer skin sheets; it must be capable of resisting flexure transverse to the general surfaces of the wing, and in so doing, must resist crushing stresses tending to urge the two skins together, or to separate them; and it must have some function in resisting torsional stresses tending to twist one panel with relation to the other. In addition, it must be of simple construction, readily assembled, and rigidly interconnected, not only to the skin sheets, but also to the several tubes of the respective panels, and it should be such as will permit the juncture of the two panels by relative movement of their edges in a direction transverse to the general planes of the panels. Also, when completed, the joint should leave substantially no break in the surface, but leave the two panels at their outer skins, and preferably also at their inner skins, flush throughout and across the joint. In addition, it is desirable that such a joint be of a nature that will function also for the securement of the joined edges of the panel to supporting structure interiorly of the wing, for instance, to a rib structure.

The joint structure of the present invention is designed to accomplish the ends above, and while its use is not limited to wing skins, it will be described in conjunction therewith, such being a typical and, indeed, a principal use of the joint structure of this invention.

The accompanying drawings make little effort to show the wing panel structures as such, since the invention is concerned primarily with the joint structure between two such panels, and this joint structure is shown in a form such as is presently preferred by me.

Figure 2 is a sectional view transversely through the wing skin as a whole, and longitudinally of the tubes, illustrating the joint structure assembled.

Figure 3 is a sectional view taken substantially on the line indicated at 3—3 in Figure 2, illustrating details of the joint structure.

Figure 1:
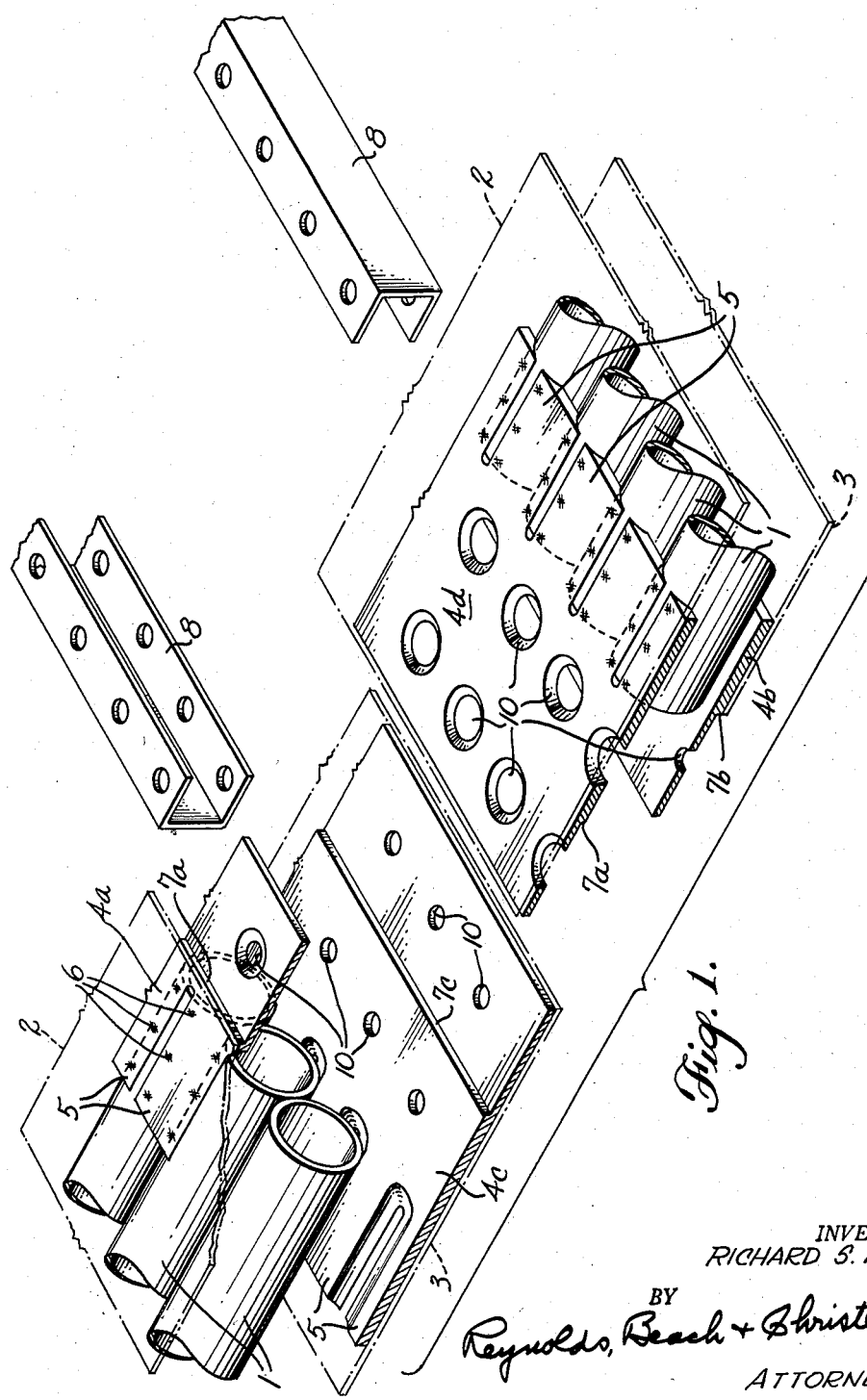
Figure 1 is an exploded isometric view, illustrating details of the joint structure.

The wing panels which are to be joined each comprises a plurality of tubes 1, usually of round cross-section, in side-by-side relation, sandwiched between an outer skin sheet 2 and an inner skin sheet 3, each of which is tangent to all the tubes 1 of the panel. Normally, the tubes themselves would be joined along their lines of tangency to one another, and each would be joined to each of the skins 2 and 3. The manner of joining is not material, and would ordinarily be by welding, brazing, or the like. Such details of the wing panel structure are not per se a part of this invention.

At a joint the several tubes 1 of a given panel would terminate in a manner such that their ends define a common plane, or similar surface. Since room must be left for the joint structure of this invention, the tubes of the left-hand panel stop short of, and are spaced apart from the tubes of the right-hand panel, as is clearly shown in Figure 2.

Reinforcing and joining plates 4a, 4b, 4c and 4d, of a formation and manner of connection which will shortly be described, are securely joined two to the edge of each panel, in a manner that they may overlap the plates of the opposite panel, and be secured thereto, to constitute the joint structure. Each such plate is of metal which would ordinarily be somewhat thicker than the skins 2 and 3, and each is milled out or otherwise recessed repeatedly inwardly from one edge to define a plurality of fingers 5, which at their inner surfaces are preferably arcuate to a curvature which matches the external curvature of the tubes 1. In any event, these fingers 5 are of a width and are spaced apart by a distance to straddle the successive tubes 1 and to contact each such tube, and at the same time, to contact the interior surface of the corresponding skin sheet 2 or 3. These details are shown most clearly in Figure 3. Here, the inner surfaces of the fingers 5 of plate 4a embrace closely the upper arcuate surfaces of the several tubes 1, and at the same time the outer surface of the plate 4a contacts the inner surface of the skin sheet 2. In like manner, the plate 4c embraces closely the lower arcuate surfaces of the tubes 1 and contacts also the inner surface of the inner skin sheet 3. The fingers 5 are of appreciable length, although less than the full width of any such plate. These plates are secured in the position indicated in any suitable manner, as by adhesive bonding, brazing, resistance or fusion welding, riveting or any combination of these. Normally, they would be spot-welded in place, and this has been indicated at 6 in Figure 1. The plates 4 may be first welded to the tube ends and then, after application of the skin, also to the skin, or if feasible, the welding may be accomplished in one operation, securing the plates 4 simultaneously to the skin and to the several tubes.

Since the fingers 5 indent only one edge of the several reinforcing plates 4, the opposite edge of each plate is continuous. The plates 4a secured to the left-hand panel and 4b secured to the right-hand panel are substantially identical, but they are secured, the plate 4a to the outer skin sheet of the left-hand panel, and the plate 4b to the inner skin sheet of the right-hand panel. In like manner, the plates 4c and 4d are substantially identical, but these are secured, the plate 4c to the inside skin sheet of the left-hand panel, and the plate 4d to the outside skin sheet of the right-hand panel. These overlapping portions of the plates 4 are preferably complementally relieved and are also preferably of unlike length, that is to say, the plate 4a is relieved at 7a along a line substantially coinciding with the ends of the tubes 1, and thence outwardly to its outer edge to match the plate 4d, which is relieved at 7d along a line spaced materially outwardly of the ends of its tubes, and thence outwardly to its outer edge, so that when the plates 4a and 4d are matched for joining, they will lie substantially in a common plane. The plate 4b is relieved at 7b similarly to the plate 4a, and the plate 4c is relieved at 7c similarly to the plate 4d, but it will be seen in Figure 2 that the line 7c of plate 4c substantially coincides with the outer end of the plate 4a of the same left-hand panel, and that the line of relief at 7d of the plate 4d substantially coincides with the outer end of the plate 4b of the same right-hand panel. Thus, the two panels, the left-hand and the right-hand ones respectively, may be joined by their relative movement in a direction perpendicular to the general plane defined by these panels, yet when joined they will lie substantially unbrokenly in a common plane. The corresponding skins extend to the ends of such portions of the plates as will enable the skins also to substantially meet in an unbroken joint, and to lie in a common plane, as will be more fully apparent from Figure 2.

The joint as so far described leaves an appreciable gap between the ends of the tubes 1 in the right-hand and left-hand panels respectively. This gap is for the reception of spacer bars 8, of which preferably there are two. These may assume any form, but are shown as channel shaped. They extend lengthwise of the joint, that is, transversely to the direction of the tubes 1. One such channel fills the space between the plates 4a and 4c of the left-hand panel, while the other spacer bar 8 fills the space between the plates 4b and 4d of the right-hand panel. Shear elements such as the rivets or bolts 9 are passed through the overlapped portions of the respective plates 4, holes 10 being provided for the purpose and countersunk as necessary to receive flush tapered heads of the bolts, as shown in Figure 2. These rivets or bolts should extend not only through the overlapped portions of the respective plates, but through the opposite plate as well, and through the spacer bar 8 intervening between the two plates. In addition, one such bolt, or both, according to any particular design, may be employed also to join the skin to a wing structural member, such as the flange 11 of the rib 12; see Figure 2.

It will be seen that the spacer bars 8 serve to resist crushing loads such as may be imposed by the bolts 9 and their securing means, and they serve also to carry shear stresses from the inner skin sheet 3 to the outer skin sheet 2. In addition, in the arrangement shown, at least one of the lines of bolts is used to attach the skin to interior supporting structure, such as the rib 12. While in Figure 1 the spacer bar channels 8 are shown as displaced in the direction of their length from their position of use between the plates 4a and 4c and 4b and 4d, respectively, it is not intended to imply that these spacer bars 8 are loose. Preferably they are secured permanently in place between the respective reinforcing plates, by means in addition to the bolts 9, as for instance, by welding or brazing.

The joint structure so formed will properly transmit stresses across the joint from one panel to the other, the maximum stresses being those which are directed lengthwise of the tubes 1. In addition, the joint structure adequately resists shear stresses, and crushing stresses transversely of the general plane of the panels. In addition, the spacer bars 8 tend to resist torsional stresses tending to twist one panel with relation to the other.

I claim as my invention:

1. In combination with two stressed airplane wing panels which are disposed in a common plane and contiguously along a common edge that is directed transversely to the direction of maximum stress, each panel incorporating a plurality of tubes extending contiguously side by side in the direction of such maximum stress and hence terminating, in each panel, adjacent the common edge, each panel also incorporating inner and outer skin sheets placed tangent to and joined to the tubes of the respective panels; a joint structure connecting the contiguous edges of the panels and including reinforcing plates which are substantially continuous along one edge but repeatedly slotted inwardly from the opposite edge, the slots being of such width, relative to the thickness of the plate, and spaced at intervals corresponding to the spacing between tube axes, to define fingers which straddle the ends of the several tubes and which at their outer surfaces lie in a plane tangent to the several tubes, to contact the interior face of a skin sheet, one such plate being so positioned and secured to the straddled tubes at each face of each panel, and the continuous edges of the two plates at the corresponding surfaces of the respective panels extending beyond the ends of the tubes and being overlapped, and means joining the overlapped plate edges for transmission of stresses from one panel to the other.

2. The combination of claim 1, wherein the joining means include spacer bars disposed between the overlapped plate portions and between the tube ends, directed transversely to the length of the tubes, and bolts or the like extending through the overlapped portions of the plates and through the spacer bars.

3. The combination of claim 1, characterized in that the tubes are of round cross-section, and the finger-forming slots of the plates are arcuate in cross-section upon a matching radius, said plates being secured to the tubes by welding.

4. The combination of claim 1, wherein the plate at one surface of a given panel is of reduced thickness, substantially from the ends of the tubes outwardly to its edge, in its continuous portion, and the plate at the opposite surface of the same panel is of full thickness outwardly to a width corresponding to the width of the first-mentioned plate, and of reduced thickness outwardly beyond such portion of full thickness, and wherein the plates of the other panel are similarly but oppositely formed to match and overlap the corresponding plates of the first-mentioned panel, to define a flush surface across the joint when joined by the joining means.

5. In combination with two stressed airplane wing panels which are disposed in a common plane and contiguously along a common edge that is directed transversely to the maximum stress, each of which panels includes a plurality of round-sectioned tubes extending side by side in the direction of the maximum stress and terminating adjacent the common edge, and each panel incorporating inner and outer skin sheets between which the tubes are sandwiched and secured, which joint structure comprises a generally planar reinforcing plate for disposition transversely of a plurality of tubes, and indented repeatedly from one edge at intervals corresponding to the spacing between tubes, to define fingers, there being four such plates the fingers of which in use straddle and are secured to the ends of successive tubes to define planes substantially tangent to the straddled tubes and located immediately beneath the respective skin sheets, in each panel, to leave the continuous opposite edge projecting beyond the ends of the tubes, the corresponding plates of the respective panels being overlapped, in use, in their continuous portions, and means to secure together the overlapped plate portions in stress-transmitting relation.

6. The combination of claim 5, wherein the plates are complementally relieved in their overlapping portions, to lie at their outer surfaces in a common plane, and the respective skin sheets extends to the edge of each plate's full width, and so substantially abut in the respective panels.

References Cited in the file of this patent

UNITED STATES PATENTS

| 2,115,504 | Wallis | Apr. 26, 1938 |
| 2,421,172 | Ulrich et al. | May 27, 1947 |
| 2,519,161 | Tucker | Aug. 15, 1950 |
| 2,693,256 | Crafton | Nov. 2, 1954 |

FOREIGN PATENTS

| 847,483 | Germany | Aug. 25, 1952 |

OTHER REFERENCES

Analysis and Design of Airplane Structures, E. F. Bruhn, AFIAS January, 1952, Tri-State Offset Company, Cincinnati 2, Ohio.